United States Patent

Friesner et al.

[11] Patent Number: 5,813,170
[45] Date of Patent: Sep. 29, 1998

[54] DIRECT SEEDING SHELTER AND METHOD FOR SEEDING

[75] Inventors: Todd Friesner, 411 W. Second St., Perrysburg, Ohio 43551; Jeff McKnight, Thunder Bay, Canada

[73] Assignee: Todd Friesner, Perrysburg, Ohio

[21] Appl. No.: 740,842

[22] Filed: Nov. 4, 1996

[51] Int. Cl.[6] ................................. A01G 13/00
[52] U.S. Cl. .................................. 47/26; 47/56; 47/30
[58] Field of Search ...................... 47/56, 21, 30, 47/26, 23

[56] References Cited

U.S. PATENT DOCUMENTS

| | | | |
|---|---|---|---|
| 1,485,924 | 3/1924 | Hobbs | 47/30 |
| 3,878,643 | 4/1975 | Greenman et al. | 47/21 |
| 4,018,003 | 4/1977 | Mirecki | 47/30 |
| 4,706,411 | 11/1987 | Lövqvist | 47/30 |
| 4,711,051 | 12/1987 | Fujimoto | 47/30 |
| 5,426,887 | 6/1995 | Spencer et al. | 47/56 |

FOREIGN PATENT DOCUMENTS

| | | | |
|---|---|---|---|
| 82449 | 12/1894 | Germany | 47/30 |
| 4654 | of 1877 | United Kingdom | 47/30 |
| 2094602 | 9/1982 | United Kingdom | 47/30 |
| 2128462 | 5/1984 | United Kingdom | 47/30 |
| 93/20684 | 10/1993 | WIPO | 47/30 |

*Primary Examiner*—Michael J. Carone
*Assistant Examiner*—Joanne C. Downs
*Attorney, Agent, or Firm*—David C. Purdue; John C. Purdue

[57] ABSTRACT

An improved direct seeding shelter is disclosed. The shelter comprises a base, a side wall, a top including a cylindrical portion and a displaceable cover that is operable, in a first position, to prevent a seed from passing from the interior of the shelter to the exterior of the shelter, through the shelter top. The shelter can be pre-seeded by inverting the shelter, positioning the displaceable cover in the first position, depositing at least one seed into the shelter and into the cylindrical portion, positioning a seed retainer in the cylindrical portion so that the retainer is frictionally engaged therein and is operable with the displaceable cover to define a seed pocket. Direct or spot seeding with the pre-seeded shelter is easily carried out by setting the shelter in the soil and depressing the at least one flap to dislodge the seed retainer. The dislodged seed and the seed retainer fall by gravity to the seeding spot. Preferably, the shelter includes a base comprising a cylindrical portion so that the shelter may be set into soil by positioning it on the soil and rotating it while applying downward pressure. The displaceable cover may comprise at least one flap integrally attached to the shelter top or a seed retainer which can be retained in the first position by frictional engagement with the cylindrical shelter top.

20 Claims, 4 Drawing Sheets

DIRECT SEEDING SHELTER AND METHOD FOR SEEDING

BACKGROUND OF THE INVENTION

1. Field of the Invention.

The present invention relates generally to the field of forestry and the sowing of tree seeds. More specifically, the invention relates to a seed shelter which is pre-seeded.

2. Description of the Prior Art

A widely practiced method of germinating seeds, particularly tree seeds, entails setting an open topped, cone-shaped shelter in soil, dropping seeds through the opening and expecting that there will be successful germination and subsequent growth. Known shelters include those disclosed in U.S. Pat. No. 3,348,992, one marketed by AB Cerko under the product name CERKON, and one known as the Hakmet shelter.

A report published in *The Forestry Chronicle*, October, 1986, demonstrates that the Hakmet shelter can be used to significantly increase the level of stocking, i.e., germination and growth after five years, as compared with bare seed sowing. The method used in the research was much more labor intensive than that described above. It involved scuffing the dirt with the boot to remove loose litter, tramping with the boot to flatten the seed spot, lightly pressing 5 to 10 seeds into the growing medium near the center of the spot, placing a shelter over the spot and securing it by firming soil or organic material around an outwardly extending flange at the base.

Despite the benefits demonstrated for shelters like the CERKON and Hakmet cones, their use involves a lot of labor which must be carried out in environments that are less than hospitable. Seeds are usually applied to the soil by hand or by a seeding tool and the smaller seeds can be especially troublesome for cold hands. Moreover, seeding tools can damage the seed coat and this will usually prevent germination. In addition, seeding tools do not work well in wet weather because of the tendency of the seeds to stick together.

U.S. Pat. No. 5,426,887 ("Spencer et al.") discloses a shelter cone having a hinged flap which extends across the opening. The flap preferably has a seed receiving depression formed in it and at least one seed is temporarily secured to the flap by a water soluble adhesive. According to the patent, water, such as rain, will cause the adhesive to release the seed allowing it to fall inside of the shelter, after it has been set. This device offers a way to eliminate some of the labor associated with the use of the shelters described above. It also affords the luxury of applying the seed to the shelter under a controlled climate while eliminating the counting of seeds at the planting site.

Reaction to this shelter has been mixed and some problems with the release of the adhesive and the seeds have been observed. Accordingly, improved stocking levels of the magnitude reported for the Hakmet shelter, for example, have yet to be achieved with the Spencer et al shelter. One solution involves the manual dislodgement of the seeds by a planter on site, but this can be hampered by the adhesive. In addition, the adhesive can break the seed coat when the seeds are manually dislodged, rendering the seed incapable of germination. Also, if the seed remains adhered to the flap for too long of a time, the seed can be damaged by sun scald or scavenged by bird predators.

There remains today a need for a pre-seeded shelter which is reliable, effective, transports well and does not depend on the environment for seed release. The primary concern, of course, is to provide a way of securing a desired number of seeds in the shelter in a manner which requires a minimum of site labor yet affords a reliable and repeatable on-site seed deposition scheme which will prevent damage to the seed and affords an opportunity for immediate visual verification that the seed has reached the growing medium. It is highly preferred that the shelter present no barrier or impediment to the emergence of the seedling through the top of the shelter.

SUMMARY OF THE INVENTION

The present invention is based upon the discovery of an improvement in pre-seedable and pre-seeded seeding shelters of the type having a substantially continuous side wall, an open bottom, a disrupted top and a displaceable cover operable in a first position, to prevent a seed from passing from inside the shelter through the top of the shelter. When pre-seeded, the shelter includes at least one displaceable seed retainer supported on the shelter adjacent to the top and to the cover. The seed retainer at the top of the shelter is operable with the cover, until they are displaced, to define a seed pocket and to prevent a seed within the pocket from passing out of the shelter through the top or otherwise. In one embodiment, the cover of the shelter top is comprised of flanges, preferably perforated, which extend inwardly and a little downwardly from the shelter top but, nonetheless, form a shelter top cover which will prevent a seed from passing out of the seed pocket. The shelter is pre-seeded, with the shelter inverted, by dropping a desired number of seeds into the shelter with the cover in place in the first position. The seed retainer, preferably in the form of a disc, is pressed into the shelter towards the top until it engages a portion of the shelter adjacent the top. The seed retainer disc and the displaceable cover are operable to define the seed pocket and to retain the seed or seeds inside the seed pocket until they are manually released, as by pressing downwardly on the cover thereby displacing it as well as the seed retainer disc and, thereby releasing the seed or seeds which fall to the soil surface. Alternatively, seed release may be achieved by pinching the top from opposite sides. In a second embodiment, the displaceable cover of the shelter top comprises a first seed retainer which is frictionally engaged in the shelter top. A second seed retainer, also frictionally engaged with the shelter top is operable, with the first seed retainer, to define a seed pocket in which seeds are retained until the cover is displaced. The shelter is pre-seeded by inverting the shelter, pressing the first seed retainer disc into the top of the shelter, from the bottom, against the disc retainer, dropping in a seed or seeds, and pressing the second seed retainer disc against the first seed retainer disc, thereby trapping the seed or seeds in the seed pocket formed therebetween. The seed retainer discs are preferably held in place by friction and, after the shelter is set in the ground, the seed retainer discs are easily dislodged, along with the seeds, by downward pressure applied to the first seed retainer disc.

Preferably, a shelter according to the invention includes an axially extending, soil engaging flange. It is also desirable that the shelter by composed of a material which is degradable to the extent that it will be inconsequential or easily broken apart by the emerging seedling.

Accordingly, it is an object of the present invention to provide a pre-seeded shelter which will hold a desired number of seeds securely in a seed pocket during shipping and field placement.

It is also an object of this invention to provide a shelter which will reliably release seed to the growing medium, when actuated by a planter, with a minimum of exertion by a planter.

It is a further object of the invention to provide a pre-seeded shelter from which seed is positively released as distinguished from a pre-seeded shelter where seed release is dependent entirely upon the environment.

It is another object of the invention to provide a pre-seeded shelter where seed release can be instantly verified.

It is another object of this invention to provide such a shelter which can easily be actuated, even by gloved hands.

It is another object of this invention to provide such a shelter with an improved base configuration which affords better and easier soil engagement than prior art shelters including those discussed above.

It is a further object of this invention to provide a shelter that presents no barrier or impediment to the emergence of the seedling through the top of the shelter.

It is yet another object of this invention to provide a shelter with a line of perforations extending from the top to the bottom which ensures that the shelter physically degrades.

DETAILED DESCRIPTION OF THE PREFERRED EMBODIMENT

Figure 1:
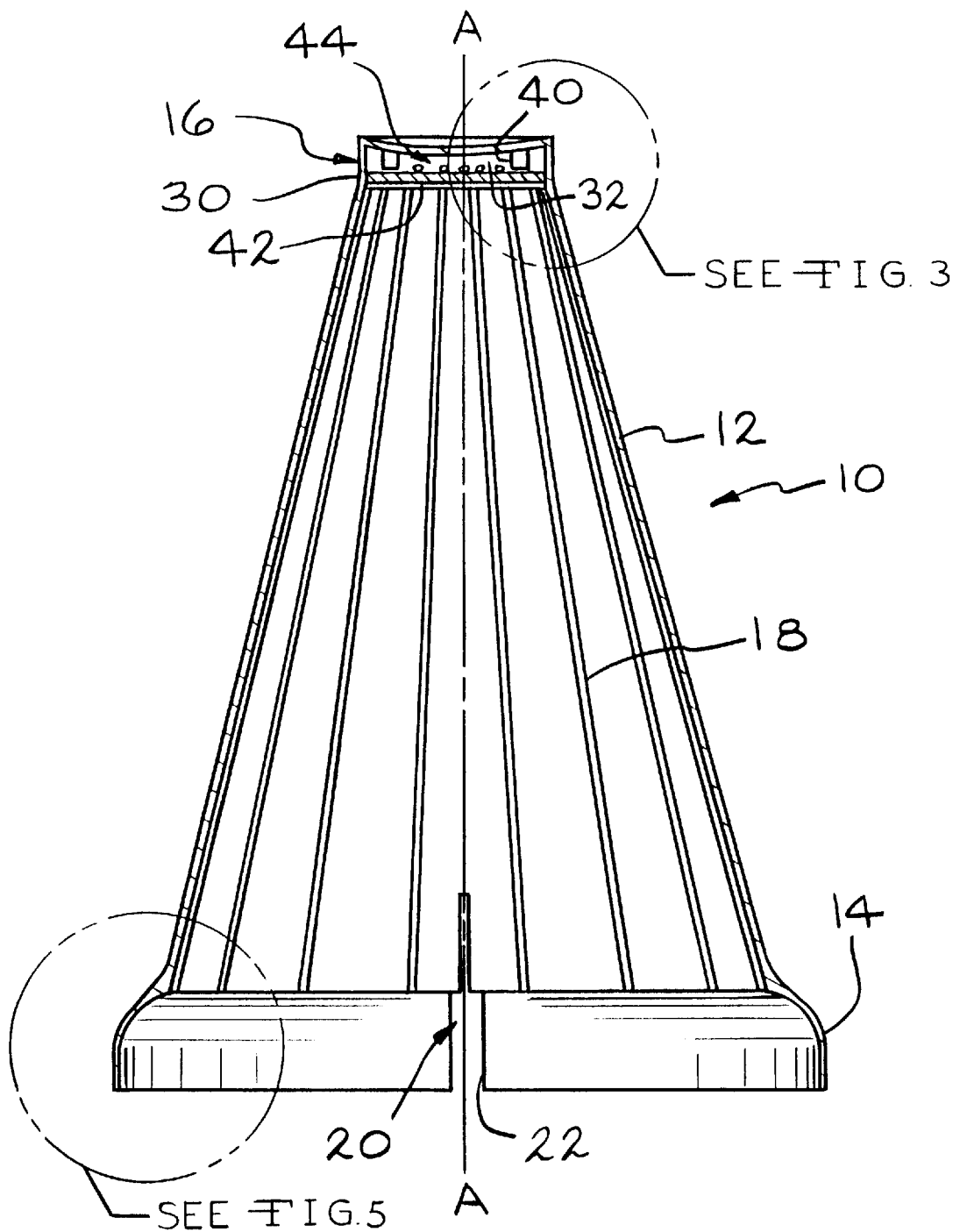
FIG. 1 is a side view, in cross-section, of a shelter according to the present invention.

Referring to FIG. 1, a shelter according to the present invention is indicated generally at 10. The shelter 10 comprises a substantially continuous side wall 12, a soil engaging base 14 and a top 16. Preferably, the shelter 10 is made from a polymer, such as polypropylene or polyethylene, which has not been rendered resistant to degradation by ultraviolet light. The polymer should be transparent or translucent so that light and warmth needed for seed germination and growth penetrates the shelter 10, in use. If desired, the shelter 10 may be made of a material which is color tinted and translucent.

The construction of such shelters, generally, is well known to those skilled in the art, as is the selection of suitable materials for this application. Thermo-forming has been used to produce prior art shelters. The shelter according to the preferred embodiment of the present invention is more preferably formed by injection molding. The side wall 12 of the shelter 10 can be very thin, i.e., 0.02 inch (0.5 millimeters). It is preferred that the side wall 12 be reinforced, for example, by way of ribs 18 formed on the inside surface of the side wall 12.

The shelter base 14 is provided with a pair of axially extending slots, indicated at 20, which are defined by base edges 22. This feature facilitates setting of the shelter 10 in soil. Specifically, when the base 14 of the shelter 10 is placed on soil, downward pressure on the shelter 10 combined with rotation of the shelter, generally about its longitudinal axis A—A, the base edge 22 helps "cut" the soil to facilitate setting of the shelter 10 in the soil.

Figure 2:
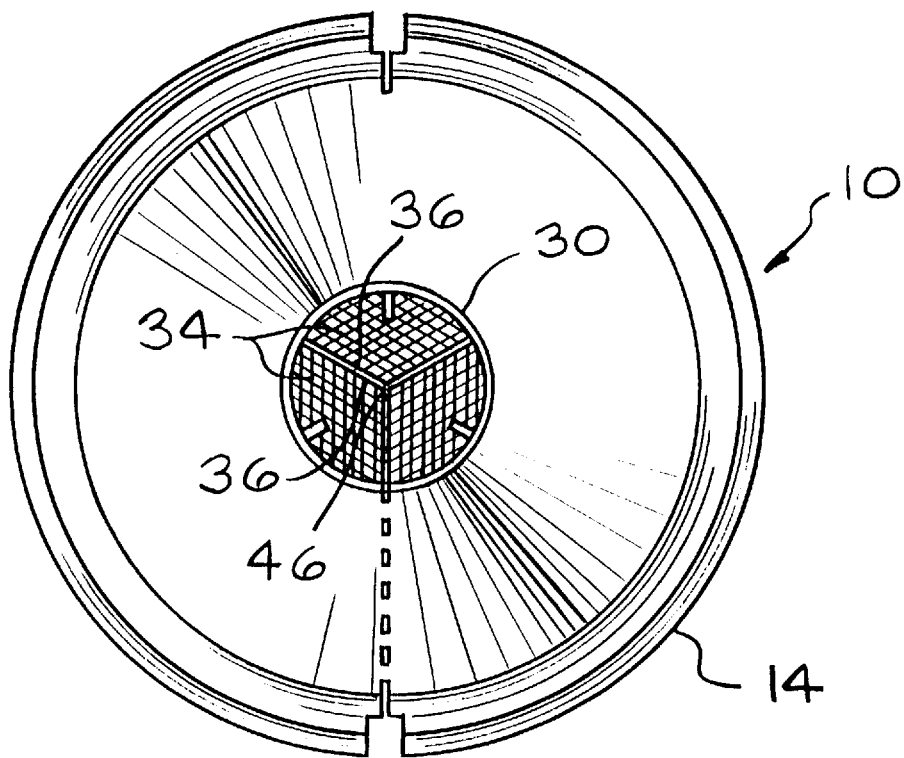
FIG. 2 is a top view of the shelter illustrated in FIG. 1.
Figure 3:
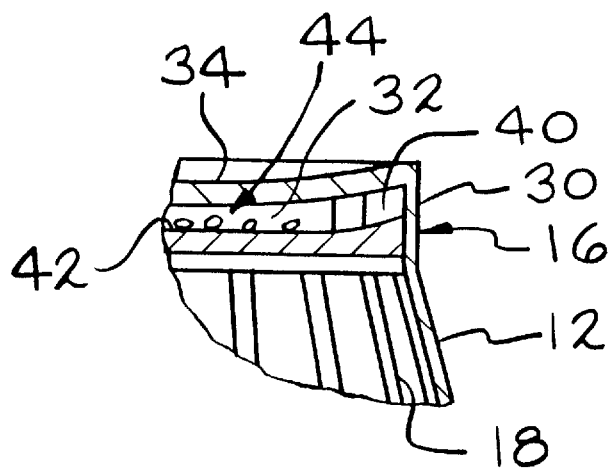
FIG. 3 is a detailed, cross-sectional view of the top portion of the shelter base designated "FIG. 3" in FIG. 1.

Referring now to FIGS. 1, 2 and 3, some details of the construction of the shelter top 16 will now be described. The shelter top 16 is comprised of a cylindrical portion 30 having an inside surface 32 (FIG. 1). The top 16 further includes a displaceable cover comprising three flaps 34 (FIG. 2) which are connected to and extend inwardly from the cylindrical portion 30 of the top 16, at the upper end of the cylindrical portion 30. The flaps 34 also extend slightly downwardly, i.e., towards the base 14 of the shelter 10, as shown in FIG. 1. As shown in FIG. 2, each flap 34 has two free edges 36 which extend in a radial direction from the shelter axis which is represented by the line A—A in FIG. 1, of the shelter 10. As can be seen in FIG. 2, a free edge 36 of one flap almost touches an edge 36 of an adjacent flap 36. Each flap is perforated so as to permit moisture to fall into the inside of the shelter 10 through the flaps 34. The perforations also effectively increase the surface area of the flap which provides more surface area for condensation of moisture from the air.

The size of the perforations in flaps 34 as well as the spacing between free edges 36 of adjacent flaps 34 are carefully controlled so that neither is big enough to permit a tree seed to pass through. The three flaps 34 together constitute a displaceable cover which is operable to prevent a seed from passing from inside of the shelter 10, through the top 16. It will be appreciated that, instead of three flaps, more or less flaps can be used. It will also be appreciated that each of the flaps need not have the same shape as each other or as the flaps 34 shown in FIG. 2, so long as they can prevent a seed from passing from the inside of the shelter 10 through the top 16. Beneath each of the flaps 34, there is a stop 40 which extends downwardly from each flap and inwardly a short distance from the inside surface 32 of the cylindrical portion 30 of the shelter top 16. In the preferred embodiment, the stops 40 extend from the flap to a point approximately half way down the inside surface 32 of the cylindrical portion 30.

A seed retainer 42 (FIGS. 1 and 3) has a circular shape and a circumference which is slightly greater than the circumference of the inside surface 32. The retainer is also made of a resilient material. Excellent results have been achieved with seed retainers comprising disc-shaped pieces of corrugated cardboard. When the seed retainer 42 is pressed into the position shown in FIG. 1, the edge of the retainer 42 frictionally engages the inside surface 32 of the cylindrical portion of the shelter top 16, whereby the seed retainer 42 is releasably held in the position shown in FIG. 1. In this position, the retainer 42 abuts the stops 40.

The displaceable cover, comprised of the flaps 34, and the seed retainer 42, together with the inside surface 32 of the cylindrical portion 30, define a seed pocket 44 in which one or more seeds may be held until the seed pocket is opened, as described below.

As noted above, the shelter 10 is preferably comprised of a polymeric material and, specifically, one that is elastic. Accordingly, one or more of the flaps 34 can be displaced or deflected from the position shown in FIG. 1 to a second position (not shown) so that movement of one or more flaps from the first position to the second position causes the seed retainer 42 to disengage from the inside surface 32 of the cylindrical portion. Specifically, a free end 46 of one or more of the flaps 34 can be deflected, for example by pushing it with a finger, downward far enough from the position shown in FIG. 1 to dislodge the seed retainer 42 from its engagement with the inside surface 32 of the cylindrical portion 30 of the shelter top 16. It should be noted that the downwardly extending flaps also can be deflected downwardly by the application of a pinching pressure applied to the outside of the cylindrical portion 30 of the shelter top 16. Once dislodged, the seed retainer 42 and any and all seeds contained in the seed pocket 44 will fall by gravity from the shelter top 16 to the bottom of the shelter 10.

Figure 4:
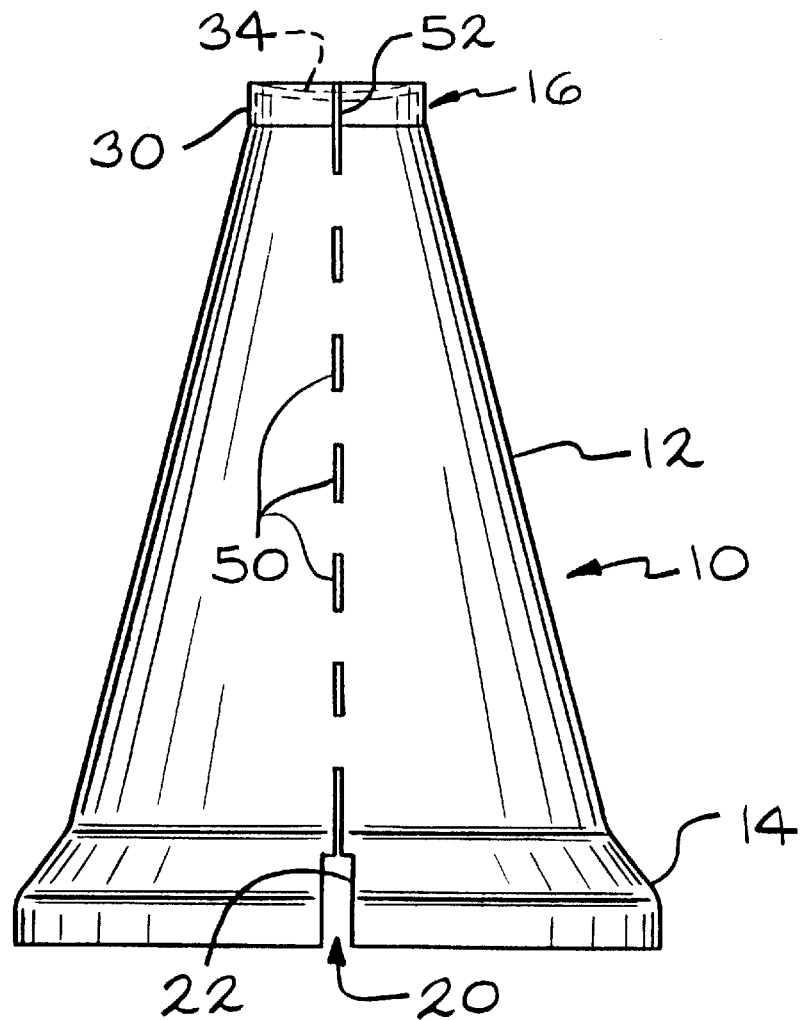
FIG. 4 is a side view of shelter illustrated in FIG. 1

The shelter 10 is preferably constructed so that it cannot girdle a seedling growing inside. Referring to FIG. 4, the side wall 12 has elongated perforations, indicated at 50, extending up the side wall 12 from one of the axially extending slots 20 in the base 14. A top slot, indicated at 52, extends from the top of the side wall 12 to the top of the shelter top 16. The top and bottom slots 52 and 20 and the elongated perforations 50 serve to weaken the shelter 10 so that it will preferentially break adjacent to the slots and the perforations, at least by the time that a seedling outgrows the shelter, thus preventing the shelter 10 from girdling the seedling.

Figure 5:
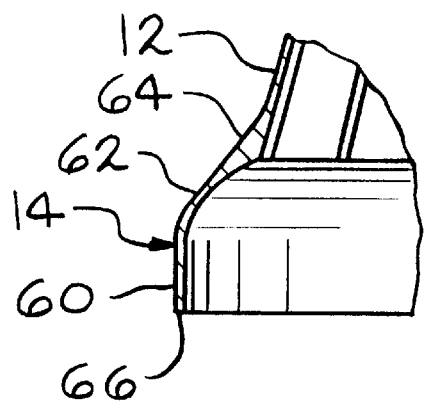
FIG. 5 is a detailed, cross-sectional view of the portion of the shelter base designated "FIG. 5" in FIG. 1.

Referring now to FIG. 5, the base 14 preferably comprises a substantially cylindrical, ground engaging portion 60. Above the ground engaging portion 60, there is a transition portion 62 which curves inwardly to a thickened, reinforcing portion 64 which connects the base 14 to the side wall 12. The cylindrical shape of the ground engaging portion 60 enables a planter to set the shelter 10 into soil by applying downward pressure to the shelter while rotating it generally about its axis. A bottom edge 66 of the ground engaging portion 60 cuts into the soil. This construction is a preferred over, for example, a shelter including a prior art laterally extending base flange which must have dirt manually placed upon it to set such a prior art shelter. It will be appreciated, however, that the above-described features of a shelter according to the invention, can be combined with other shelter base configurations including a laterally extending base flange.

There are two distinct methods involved in using the shelter 10, namely, a method for pre-seeding the shelter and a method for using the pre-seeded shelter to direct seed. According to the method of the present invention for pre-seeding the shelter, the shelter 10 is preferably inverted and a desired number of seeds are dropped through the shelter base 14 and they fall against the flaps 34 which constitute a displaceable cover which is operable to prevent the seed(s) from falling out of the shelter 10 through the top. A seed retainer corresponding with the retainer 42 is pressed downwardly towards the cylindrical portion 30 of the shelter top 16 until it firmly and frictionally engages the inside surface 32 thereof. This is the end of the method for pre-seeding the shelter and the seeds which have been placed into the shelter 10 are now retained in the seed pocket 44 formed by the flaps 34, the seed retainer 42 and the inside surface 32 of the cylindrical portion 30 of the shelter top. Once loaded, the shelter 10 can be stacked, packed, transported, unpacked and unstacked without disturbing the seeds in the seed pocket 44. The loaded shelter can even be dropped without disturbing the seeds in the pocket 44.

A method for direct seeding using a pre-seeded shelter according to the present invention starts with the selection of a desired seed spot. Preferably, debris is removed from the seed spot. Then, the loaded shelter is positioned over the seed spot and the edge 66 of the base 14 is brought into engagement with the ground. Downward pressure is applied to the shelter while it is rotated until the shelter base 14 is firmly engaged with the soil around the seed spot, i.e., the shelter is set. Once the shelter is set in the soil, downward pressure is applied to at least one of the flaps 34 causing it to be displaced or deflected downwardly to the extent necessary to dislodge the seed retainer 42 from the cylindrical portion 30 of the shelter top 16. Once dislodged, the retainer 42 and any seed in the seed pocket 44 fall from the shelter top 16 to the soil surface. There, the seed will be protected by the shelter 10 and nurtured by the favorable conditions which prevail inside of such shelters, generally. In addition, because the shelter is transparent or translucent, a planter can visually confirm that the seed has been released and thus, the instant shelter does not depend upon the environment to effect seed release.

Figure 6:
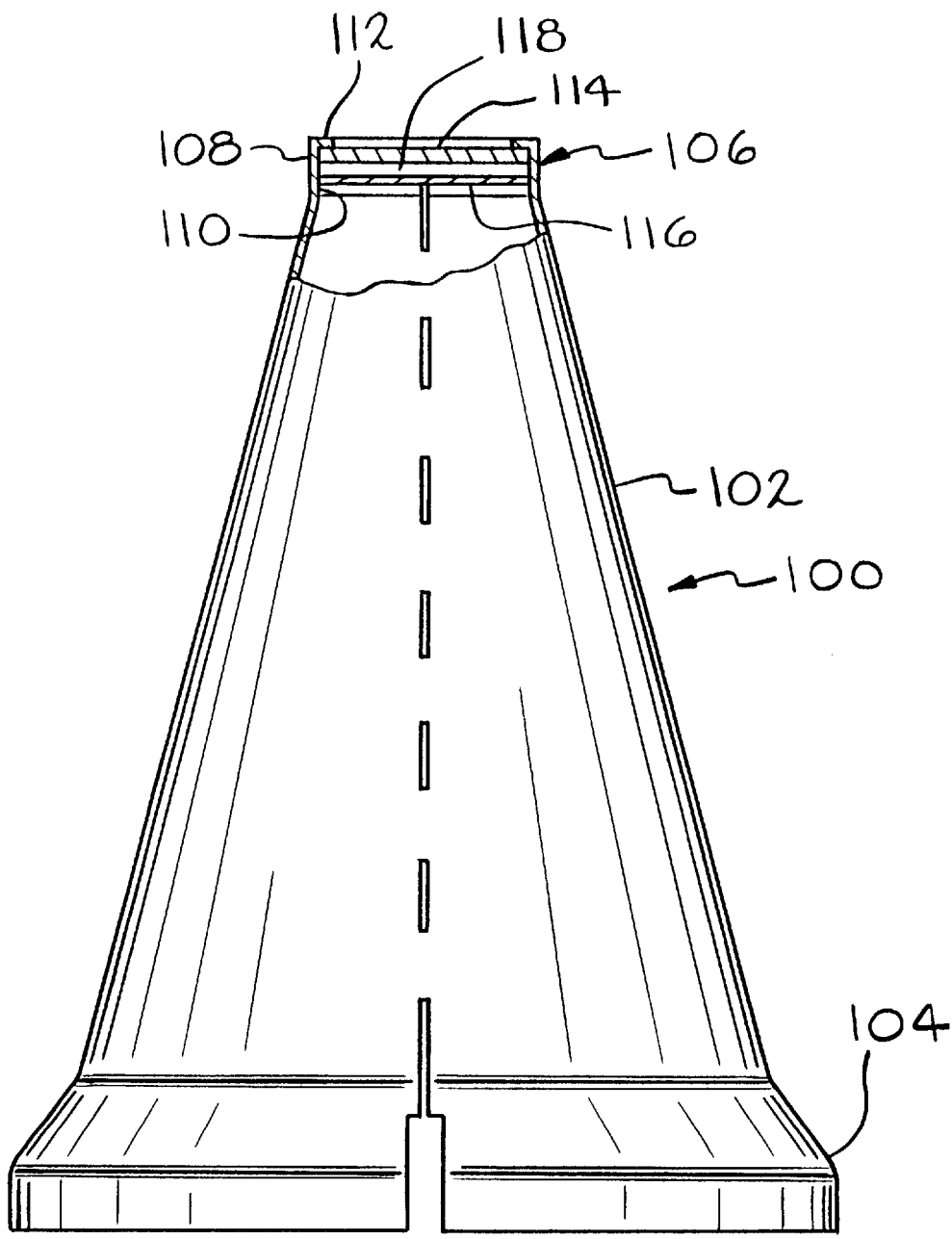
FIG. 6 is side view, partially in cross-section, of a second embodiment of a tree shelter according to the present invention.

Referring now to FIG. 6, a second embodiment of a shelter according to the invention is indicated generally at 100. The shelter 100 comprises a side wall 102, a soil engaging base 104, a top 106 and, except for the construction of the top 106, generally corresponds with the shelter 10. The top 106 has a substantially cylindrical side wall 108 with an inner surface 110. Above the side wall 108, there is a disc retainer 112 which extends radially inwardly from the side wall 108. In this embodiment, the disc retainer 112 is simply a flange which extends radially inwardly a short distance from the inner surface 110 of the side wall 108. The disc retainer 112 is illustrated in its preferred form which is integral with the side wall 108. In view of the function of the retainer 112, which is to prevent a disk from passing out of the top 106, it will be appreciated that the retainer can take many forms and could even be made from a separate piece and secured to the top 106.

A first seed retainer disc 114 is positioned in the shelter 100, against the disc retainer 112. In this embodiment, the first seed retainer disc constitutes the displaceable cover and is operable, in the position shown in FIG. 6, to prevent a seed from passing out of the inside of the shelter 100, through the top 106. A second seed retainer disc 116 is positioned inside the top 106 of the shelter 100 and is frictionally retained therein. The first and second seed retainer discs 114 and 116 define, together with a portion of the cylindrical side wall 108 of the top 106, a seed pocket 118.

According to the method of the present invention for pre-seeding the shelter 100, it is inverted and the first seed retainer disc 114 is pressed into the position shown in FIG. 6, from inside the shelter 100, so that the disc 114 abuts the disc retainer 112. With the first seed retainer disc 114 in place, a desired number of seeds are dropped through the shelter base 104 and they fall against the first seed retainer disc which constitutes a displaceable cover which is operable to prevent the seed(s) from falling out of the shelter 100 through the top 106. A second seed retainer disc 116 is pressed downwardly towards the cylindrical portion 108 of the shelter top 106 until the disc 116 firmly and frictionally engages the inside surface 110 thereof. This is the end of the method for pre-seeding the shelter and the seeds which have been placed into the shelter 100 are now retained in the seed pocket 118 formed by the first seed retainer disc 114, the second seed retainer disc 116 and the inside surface 110 of the cylindrical portion 108 of the shelter top 106. Once loaded, the shelter 100 can be stacked, packed, transported, unpacked and unstacked without disturbing the seeds in the seed pocket 118. The loaded shelter can even be dropped without disturbing the seeds in the pocket 118. Although the first and second seed retaining discs are illustrated as being slightly spaced from each other, in practice, these discs will be very close together and may touch each other, especially around their edges.

The use of the pre-seeded shelter 100 in direct seeding according to the method of the present invention, is very similar to that described above with reference to the shelter 10 except that the first seed retainer disc 114 is displaced or deflected downwardly, dislodging the second seed retainer disc 116, whereupon the seeds from the seed pocket 118 fall to the soil. In this embodiment, with the seed retaining discs dislodged, there is absolutely no barrier or impediment to the emergence of the seedling through the top of the shelter.

The foregoing description of the preferred embodiments of the present shelter invention is intended to enable one skilled in the art to practice the invention and to set forth the best mode presently known to the inventors to practice the invention. The invention is subject, of course, to modifications and improvements which, though not specifically disclosed above, may fall, nonetheless, within the scope of the following claims.

What is claimed is:

1. A direct seeding shelter comprising
   a substantially continuous side wall defining an interior portion of the shelter,
   a base for engaging soil at a planting site and
   a top, said top comprising
      a generally cylindrical portion having an inside cylindrical surface, and
      a displaceable cover which is operable, in a first position, to prevent a seed from passing from the interior of the shelter to the exterior of the shelter, through the shelter top and
   a seed retainer operable to frictionally engage said inside cylindrical surface and to define, with said displaceable cover in said first position, a seed retaining pocket.

2. The shelter claimed in claim 1 wherein said displaceable cover comprises at least three seed retaining flaps, each having a free end, said seed retaining flaps being supported on said cylindrical portion so as to close the upper end of the cylindrical portion to the extent that a seed will not pass through.

3. The shelter claimed in claim 1 wherein said base comprises a cylindrical portion having a lower, ground cutting edge.

4. The shelter claimed in claim 3 wherein said displaceable cover comprises a seed retaining disc.

5. The shelter claimed in claim 1 wherein said side wall has a series of perforations extending from said top to said base.

6. The shelter claimed in claim 1 wherein said displaceable cover comprises a seed retaining disc.

7. A pre-seeded shelter comprising
   a substantially continuous side wall,
   a base for engaging soil at a planting site and
   a top, said top comprising
      a generally cylindrical portion having an inside cylindrical surface,
      a displaceable cover which is operable, in a first position, to prevent a seed from passing from the interior of the shelter to the exterior of the shelter, through the shelter top,
      a seed retainer positioned in said cylindrical portion, said seed retainer being operable together with the inside surface of said cylindrical portion and said displaceable cover to define a seed retaining pocket and
      at least one seed contained in said seed retaining pocket.

8. The shelter claimed in claim 7 wherein said displaceable cover can be manually displaced downwardly from the top to dislodge said seed retainer and said at least one seed.

9. The shelter claimed in claim 8 wherein said side wall has a series of perforations extending from said top to said base.

10. The shelter claimed in claim 7 wherein said top comprises three seed retaining flaps, each having a free end, said seed retaining flaps being supported on said cylindrical portion so as to close the upper end of the cylindrical portion to the extent that a seed will not pass through.

11. The shelter claimed in claim 10 wherein at least one of said seed retaining flaps has a free end which can be manually displaced to dislodge said seed retainer.

12. The shelter claimed in claim 11 wherein each of said three seed retaining flaps has a free end, any one of which can be displaced to dislodge said seed retainer and said at least one seed.

13. The shelter claimed in claim 7 wherein said side wall has a series of perforations extending from said top to said base.

14. The shelter claimed in claim 13 wherein said displaceable cover comprises a seed retaining disc.

15. The shelter claimed in claim 7 wherein said displaceable cover comprises a seed retaining disc.

16. A method for direct seeding, said method comprising the steps of setting in a seed spot a pre-seeded shelter comprising
   a substantially continuous side wall,
   a base for engaging soil at a planting site and
   a top, said top comprising
      a cylindrical portion having an inside cylindrical surface,
      a displaceable cover which is operable, in a first position, to prevent a seed from passing from the interior of the shelter to the exterior of the shelter, through the shelter top,
      a seed retainer positioned in said cylindrical portion, said seed retainer being operable, together with the inside surface of said cylindrical portion and said displaceable cover to define a seed retaining pocket and
      at least one seed contained in said seed retaining pocket,
   and downwardly displacing said displaceable cover thereby dislodging said seed retainer and said at least one seed from said shelter top.

17. The method claimed in claim 16 wherein said displaceable cover comprises at least one seed retaining flap that has a free end and wherein said free end is downwardly displaced to dislodge said seed retainer and said at least one seed.

18. The method claimed in claim 17 wherein said displaceable cover comprises three seed retaining flaps, each having a free end, said seed retaining flaps being supported on said cylindrical portion so as to close the upper end of the cylindrical portion to the extent that a seed will not pass through.

19. The method claimed in claim 18 wherein at least one of said seed retaining flaps has a free end which can be manually displaced to dislodge said seed retainer.

20. The method claimed in claim 16 wherein said displaceable cover comprises a seed retaining disc.

* * * * *